US011413991B2

(12) United States Patent
Zhao

(10) Patent No.: US 11,413,991 B2
(45) Date of Patent: Aug. 16, 2022

(54) CHILD SAFETY SEAT

(71) Applicant: Wonderland Switzerland AG, Steinhausen (CH)

(72) Inventor: Guang-Hui Zhao, Guangdong (CN)

(73) Assignee: WONDERLAND SWITZERLAND AG, Steinhausen (CH)

(*) Notice: Subject to any disclaimer, the term of this patent is extended or adjusted under 35 U.S.C. 154(b) by 54 days.

(21) Appl. No.: 17/035,169

(22) Filed: Sep. 28, 2020

(65) Prior Publication Data

US 2021/0094447 A1 Apr. 1, 2021

(30) Foreign Application Priority Data

Sep. 30, 2019 (CN) .......................... 201910944356.3

(51) Int. Cl.
*B60N 2/28* (2006.01)

(52) U.S. Cl.
CPC .......... *B60N 2/2806* (2013.01); *B60N 2/286* (2013.01); *B60N 2/2821* (2013.01); *B60N 2/2863* (2013.01)

(58) Field of Classification Search
CPC .... B60N 2/2863; B60N 2/286; B60N 2/2821; B60N 2/265; B60N 2/28; B60N 2/2803; B60N 2002/2815; B60N 2002/2818
See application file for complete search history.

(56) References Cited

U.S. PATENT DOCUMENTS

| | | | | |
|---|---|---|---|---|
| 7,926,874 B2* | 4/2011 | Hendry | ................ | B60N 2/2845 297/256.16 |
| 8,262,161 B2* | 9/2012 | Fritz | .................... | B60N 2/2806 297/253 |
| 2010/0187880 A1* | 7/2010 | Heisey | ................. | B60N 2/2821 297/256.16 |
| 2018/0370392 A1 | 12/2018 | Harmes, V et al. | | |

OTHER PUBLICATIONS

Office Action and the search report in Taiwanese counterpart 109133541 (English translation) dated Jul. 2, 2021.

* cited by examiner

*Primary Examiner* — Syed A Islam
(74) *Attorney, Agent, or Firm* — NZ Carr Law Office PLLC

(57) ABSTRACT

A child safety seat includes a seat shell, a belt tightener and a latching mechanism. The seat shell includes a seat portion and a backrest portion respectively having a first and a second belt path, each of the first and second belt path being configured to receive an anchoring belt for attaching the child safety seat on a vehicle seat. The belt tightener is pivotally connected with the seat shell and carries a first and a second pressing portion, the belt tightener being movable between a first position for clamping an anchoring belt disposed along the first belt path with the first pressing portion in contact with the anchoring belt, and a second position for clamping an anchoring belt disposed along the second belt path with the second pressing portion in contact with the anchoring belt. The latching mechanism can lock the belt tightener in the first and second position.

22 Claims, 9 Drawing Sheets

CHILD SAFETY SEAT

CROSS-REFERENCE TO RELATED APPLICATION(S)

This application claims priority to China patent application no. 201910944356.3 filed on Sep. 30, 2019.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., child's head and torso). Accordingly, safety experts and car seat manufacturers usually recommend to seat children in a vehicle in a rear facing configuration until the age of 2 years old. As the child grows older, the child safety seat then may be installed in a forward facing configuration.

The installation of the child safety seat usually requires securely attaching the child safety seat on the vehicle seat with a vehicle seatbelt or a harness separately provided. Depending on whether the child safety seat is installed in the rearward or forward facing configuration, the vehicle seatbelt or harness generally needs to be threaded along different paths and has to be properly tightened with attachment systems provided in the child safety seat. Unfortunately, the attachment systems used in some existing child safety seats may not offer convenient operation.

Therefore, there is a need for an improved child safety seat that allows convenient attachment on a vehicle seat with minimal effort, and can address at least the foregoing issues.

SUMMARY

The present application describes a child safety seat that is easy to operate and can provide proper tension in an anchoring belt for securely attaching the child safety seat on a vehicle seat in a rearward and forward facing position.

According to one aspect, the child safety seat includes a seat shell adapted to receive a child, a belt tightener pivotally connected with the seat shell, and a latching mechanism. The seat shell includes a seat portion having a first belt path, and a backrest portion having a second belt path, each of the first and second belt path being configured to receive an anchoring belt for attaching the child safety seat on a vehicle seat. The belt tightener carries a first and a second pressing portion, the belt tightener being movable as a single body between a first position for clamping an anchoring belt disposed along the first belt path with the first pressing portion in contact with the anchoring belt, and a second position for clamping an anchoring belt disposed along the second belt path with the second pressing portion in contact with the anchoring belt. The latching mechanism is operable to lock the belt tightener in the first and second position.

According to another aspect, the child safety seat includes a seat shell adapted to receive a child, a belt tightener pivotally connected with the seat shell, and a latching mechanism. The seat shell includes a seat portion having a first belt path, and a backrest portion having a second belt path, each of the first and second belt path being configured to receive an anchoring belt for attaching the child safety seat on a vehicle seat, the backrest portion being attachable to and detachable from the seat portion. The belt tightener is movable as a single body between a first position for clamping an anchoring belt disposed along the first belt path, and a second position for clamping an anchoring belt disposed along the second belt path. The latching mechanism is operable to lock the belt tightener in the first and second position.

DETAILED DESCRIPTION OF THE EMBODIMENTS

Figure 1:
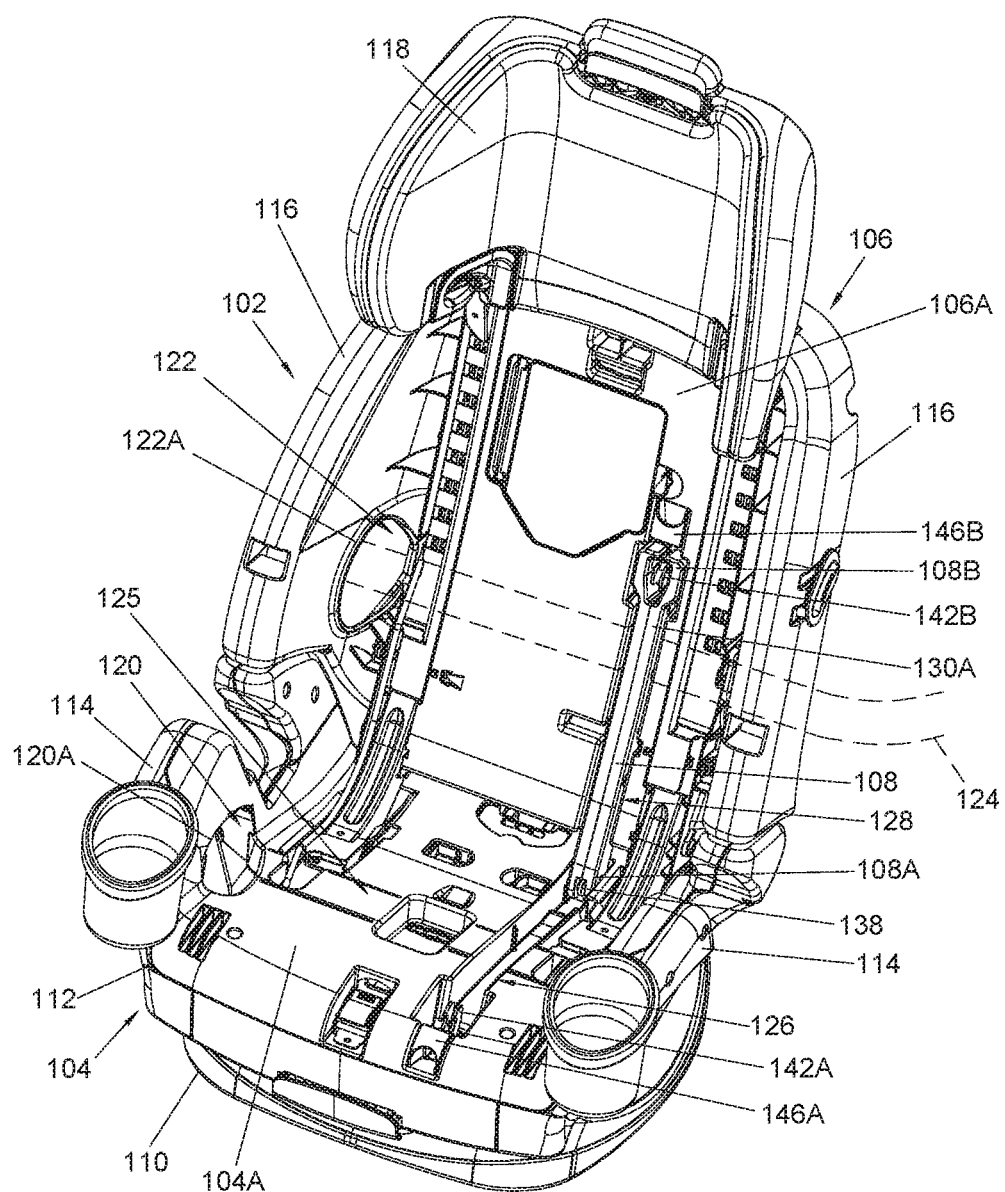
FIG. 1 is a perspective view illustrating an embodiment of a child safety seat having a belt tightener in a position adapted to clamp an anchoring belt disposed along a belt path.
Figure 2:
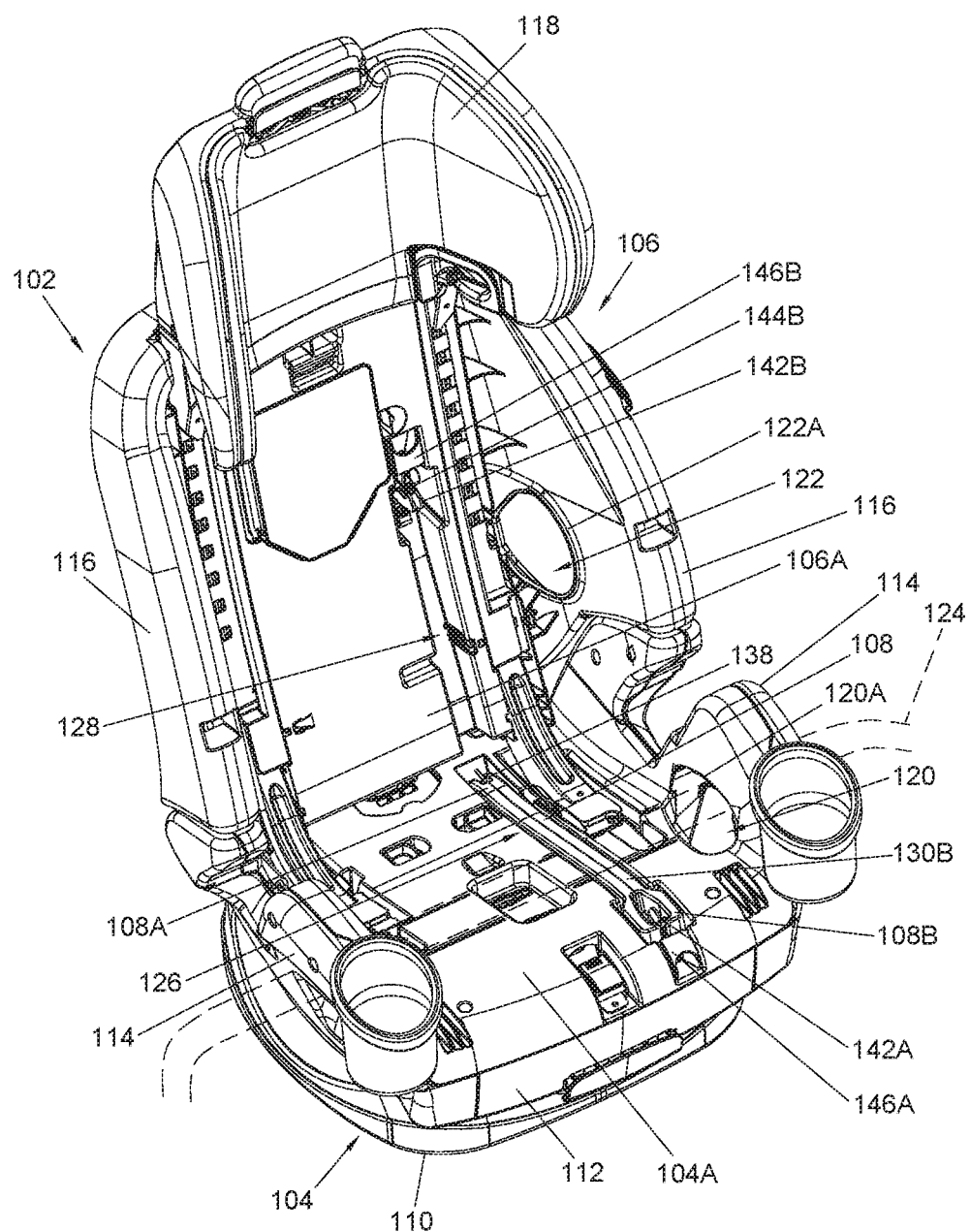
FIG. 2 is s a perspective view illustrating the child safety seat shown in FIG. 1 with the belt tightener in another position adapted to clamp an anchoring belt disposed along another belt path.

FIGS. 1 and 2 are perspective views illustrating an embodiment of a child safety seat 100. Referring to FIGS. 1 and 2, the child safety seat 100 can include a rigid seat shell 102, and a belt tightener 108 connected with the seat shell 102. The seat shell 102 is adapted to receive a child, and can have a seat portion 104 and a backrest portion 106.

According to an example of construction, the seat portion 104 and the backrest portion 106 may be detachably connected with each other, whereby the backrest portion 106 can be detached from and attached to the seat portion 104 according to a desired configuration of use. For example, the backrest portion 106 may be removed from the seat portion 104 so that the seat portion 104 can be used alone as a booster seat for seating a child on a vehicle seat. When it is needed, the backrest portion 106 may be attached to the seat portion 104 to provide support for a child's back.

In other examples of construction, the backrest portion 106 may be permanently connected fixedly with the seat portion 104 so that the backrest portion 106 is not detachable from the seat portion 104 during use.

Referring to FIGS. 1 and 2, the seat portion 104 can include a support base 110 and a seat platform 112 connected with each other. The support base 110 may provide stable support on a vehicle seat, and the seat platform 112 may slide relative to the support base 110 for recline adjustment. Moreover, the seat portion 104 can have a support surface 104A generally facing upward that is carried on the seat platform 112 and extends from a front to a rear of the seat portion 104. The support surface 104A can be sideways delimited by two sidewall portions 114 that are respectively provided at a left and a right side of the seat portion 104 and protrude upward from the support surface 104A. The support surface 104A and the two sidewall portions 114 can at least partially delimit an inner region of the seat portion 104 adapted to receive a lower body portion of a child.

The backrest portion 106 can have a support surface 106A generally facing forward that extends from a top to a bottom of the backrest portion 106. The support surface 106A can be sideways delimited by two sidewall portions 116 that are respectively provided at a left and a right side of the backrest portion 106 and protrude forward from the support surface 106A. The support surface 106A and the two sidewall portions 116 can at least partially delimit an inner region of the backrest portion 106 adapted to receive an upper body portion of a child. Moreover, the backrest portion 106 may be provided with a headrest 118, which can move vertically along the support surface 106A for adjustment according to the size of a child. According to an example of construction, the backrest portion 106 can be detachably connected with the seat platform 112 of the seat portion 104, and can move along with the seat platform 112 relative to the support base 110 for recline adjustment.

Referring to FIGS. 1 and 2, the seat shell 102 can have a belt path 120 configured to receive an anchoring belt for attaching the child safety seat 100 in a rearward facing position on a vehicle seat (i.e., the front of the seat shell 102 facing a seatback of the vehicle seat), and another belt path 122 configured to receive an anchoring belt for attaching the child safety seat 100 in a forward facing position on a vehicle seat (i.e., the front of the seat shell 102 facing a front of the vehicle seat). The belt path 120 can include two openings 120A respectively provided symmetrically through the two sidewall portions 114 in a region corresponding to the seat portion 104, and the belt path 122 can include two openings 122A respectively provided symmetrically through the two sidewall portions 116 in a region corresponding to the backrest portion 106. An anchoring belt 124 (shown with phantom lines in FIGS. 1 and 2) may be routed along the belt path 120 for attaching the child safety seat 100 in a rearward facing position on a vehicle seat, and along the belt path 122 for attaching the child safety seat 100 in a forward facing position on a vehicle seat. According to an example of construction, a guiding structure 125 may also be provided for facilitating the positioning of the anchoring belt 124 along the belt path 120 (and/or 122), wherein the guiding structure may exemplary include a plurality of ribs or a channel structure.

Figure 3:
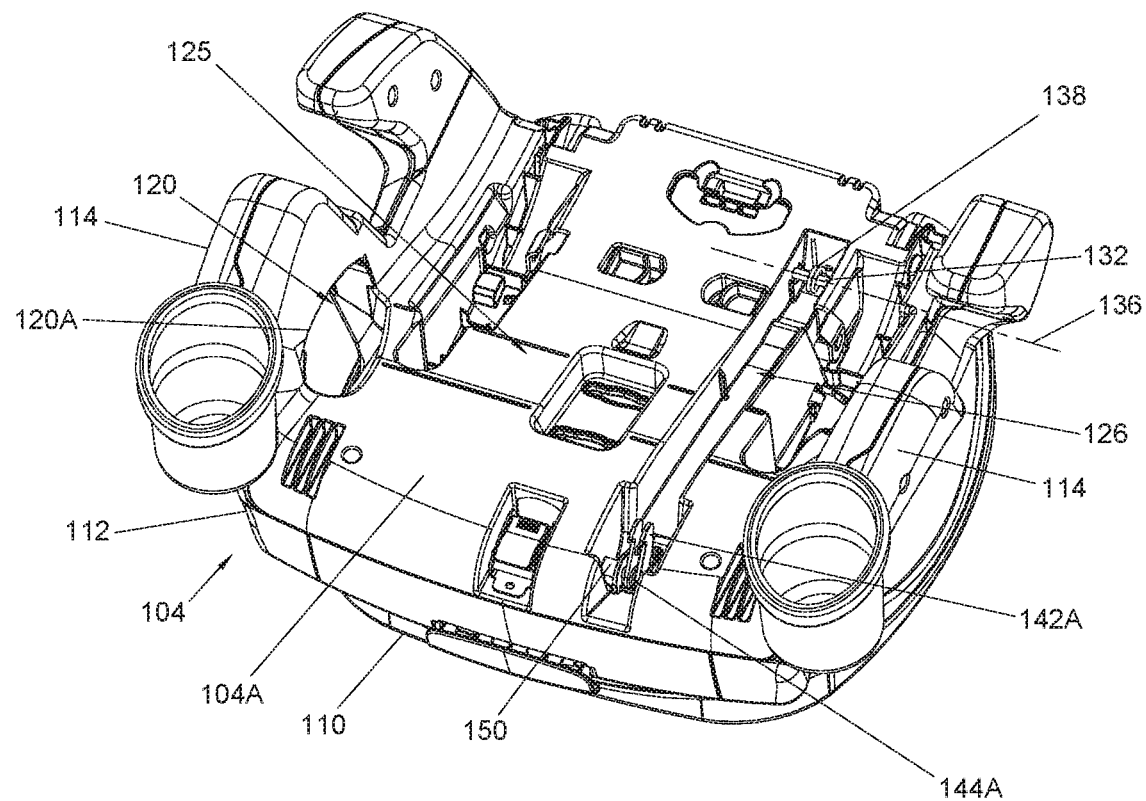
FIG. 3 is a perspective view illustrating a seat portion of the child safety seat shown in FIG. 1.
Figure 4:
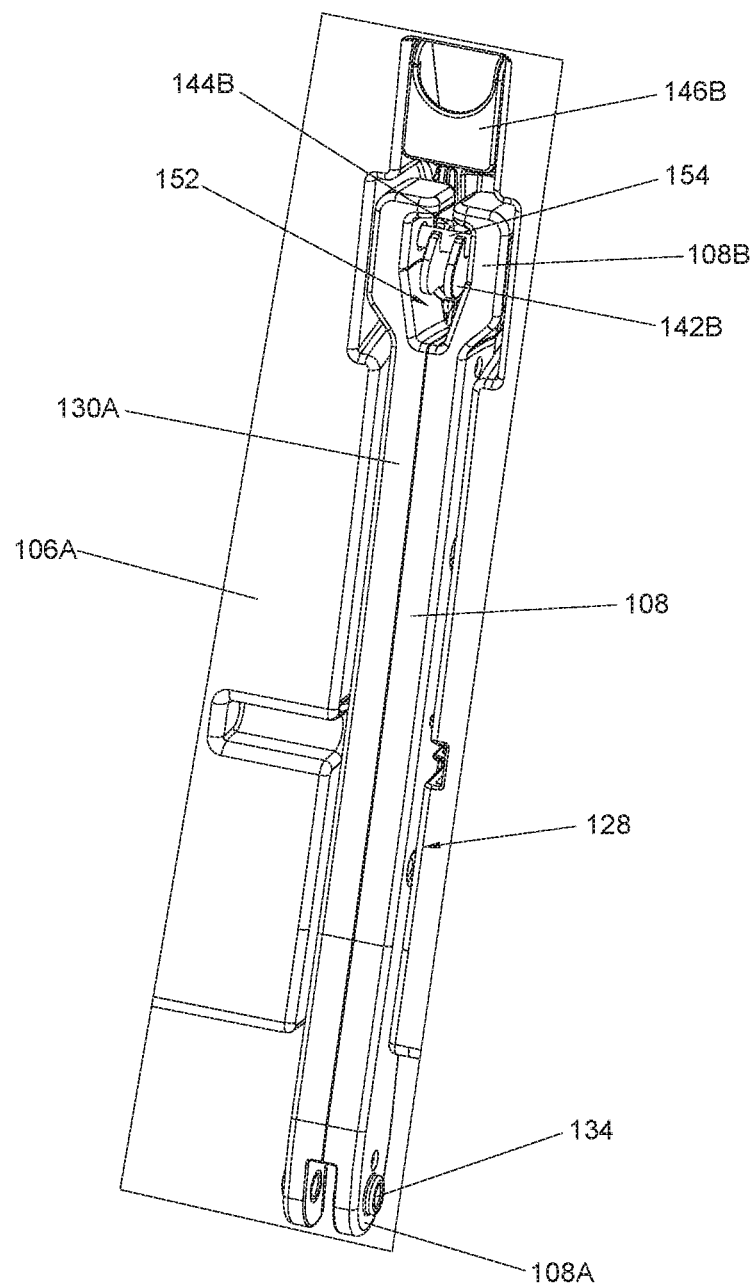
FIG. 4 is an enlarged view illustrating some construction details of the belt tightener provided in the child safety seat.
Figure 5:
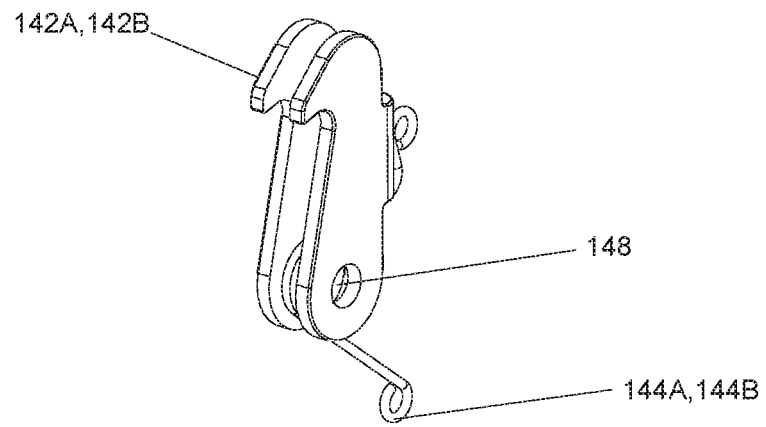
FIG. 5 is a perspective view illustrating construction details of a latch and a spring provided in a latching mechanism for locking the belt tightener in position.

In conjunction with FIGS. 1 and 2, FIG. 3 is a perspective view illustrating further construction details of the seat portion 104, and FIG. 4 is an enlarged view illustrating some construction details of the belt tightener 108. Referring to FIGS. 1-4, the belt tightener 108 is operable to hold and tension the anchoring belt 124 for ensuring tight attachment of the child safety seat 100. According to an example of construction, the belt tightener 108 may have an elongate shape extending between two opposite end portions 108A and 108B of the belt tightener 108. The belt tightener 108 can be pivotally connected with the seat shell 102, and is rotatable as a single body relative to the seat shell 102 for adjustment between different positions shown in FIGS. 1 and 2. More specifically, the belt tightener 108 is adjustable between a first position shown in FIG. 2 where the belt tightener 108 can clamp and tighten an anchoring belt 124 disposed along the belt path 120, and a second position shown in FIG. 1 where the belt tightener 108 can clamp and tighten an anchoring belt 124 disposed along the belt path 122.

According to an example of construction, the seat shell 102 can have a cavity 126 provided on the support surface 104A of the seat portion 104 that overlaps with the belt path 120, and a cavity 128 provided on the support surface 106A of the backrest portion 106 that overlaps with the belt path 122. The belt tightener 108 can respectively push and clamp an anchoring belt 124 in the cavity 126 in the first position and in the cavity 128 in the second position. According to an example of construction, the seat shell 102 may have a central axis equidistant from the sidewall portions 114 and 116, and the belt tightener 108 and the cavities 126 and 128 may be disposed offset from the central axis to leave room at a center of the seat shell 102 for placement of harness components such as a harness a-lock strap, a crotch buckle and the like.

According to an example of construction, the belt tightener 108 can carry two pressing portions 130A and 130B, which can be provided at two opposite sides of the belt tightener 108. For example, the two pressing portions 130A and 130B can include two opposite surfaces of the belt tightener 108. The belt tightener 108 with the pressing portions 130A and 130B carried thereon can move as a single body for adjustment between the first and second position. When the belt tightener 108 is in the first position, the pressing portion 130B is oriented toward an outer side of the cavity 126, and the belt tightener 108 is adapted to clamp and tension the anchoring belt 124 disposed along the belt path 120 with the pressing portion 130A oriented toward the interior of the cavity 126 and in contact with the anchoring belt 124. When the belt tightener 108 is in the second position, the pressing portion 130A is oriented toward an outer side of the cavity 128, and the belt tightener 108 is adapted to clamp and tension the anchoring belt 124 disposed along the belt path 122 with the pressing portion 130B oriented toward the interior of the cavity 128 and in contact with the anchoring belt 124.

The belt tightener 108 can be pivotally connected with the seat shell 102 at a location adjacent to a junction between the seat portion 104 and the backrest portion 106. According to an example of construction, the belt tightener 108 can be pivotally connected with the seat portion 104 of the seat shell 102. For example, the end portion 108A of the belt tightener 108 can have a hole 134, and a pivot shaft 132 (better shown in FIG. 3) fixedly connected with the seat platform 112 of the seat portion 104 inside the cavity 126 can pass through the hole 134 for pivotally supporting the belt tightener 108. The belt tightener 108 is thereby coupled to the seat portion 104, and can rotate about a pivot axis 136 extending transversally from the left to the right side of the seat shell 102.

With the aforementioned construction, the belt tightener 108 can selectively close the cavity 126 in the first position shown in FIG. 2 and the cavity 128 in the second position shown in FIG. 1. More specifically, when the belt tightener 108 is in the first position, the belt tightener 124 can extend toward the front of the seat portion 104 with the pressing portion 130A of the belt tightener 108 at least partially received in the cavity 126 and pushing therein an anchoring belt 124 that is routed along the belt path 120, which corresponds to a clamping state suitable for installation of the child safety seat 100 in a rearward facing position. When the belt tightener 108 is in the second position, the belt tightener 108 can extend toward a top of the backrest portion 106 with the pressing portion 130B of the belt tightener 108 at least partially received in the cavity 128 and pushing therein an anchoring belt 124 that is routed along the belt path 122, which corresponds to a clamping state suitable for installation of the child safety seat 100 in a forward facing position.

Referring to FIGS. 1-3, the child safety seat 100 can further include a spring 138 operable to bias the belt tightener 108 toward a release state for facilitating a caregiver's operation. According to an example of construction, the spring 138 may be a torsion spring disposed around the pivot shaft 132 with two ends of the spring 138 respectively connected with the seat portion 104 and the belt tightener 108. The biasing force of the spring 138 can urge the belt tightener 108 to rotate in a direction for at least partially ejecting the end portion 108B of the belt tightener 108 out of the cavity 126.

According to another example of construction, the belt tightener 108 may be pivotally connected with the backrest portion 106 rather than the seat portion 104. In this case, the pivot shaft 132 that pivotally supports the belt tightener 108 may be fixedly connected with the backrest portion 106 inside the cavity 128. With this variant construction, the belt tightener 108 is likewise rotatable between the first position for clamping and tightening an anchoring belt 124 disposed along the belt path 120, and the second position for clamping and tightening an anchoring belt 124 disposed along the belt path 122. In this variant construction, the spring 138 may have two ends respectively connected with the backrest portion 106 and the belt tightener 108, whereby the biasing force of the spring 138 can urge the belt tightener 108 rotate in a direction for at least partially ejecting the end portion 108B of the belt tightener 108 out of the cavity 128.

In conjunction with FIGS. 1-4, FIGS. 5-10 are schematic views illustrating a latching mechanism 140 operable to lock the belt tightener 108 in the first and second position. Referring to FIGS. 1-10, the latching mechanism 140 can include two latches 142A and 142B, two springs 144A and 144B and two release actuators 146A and 146B.

Figure 9:
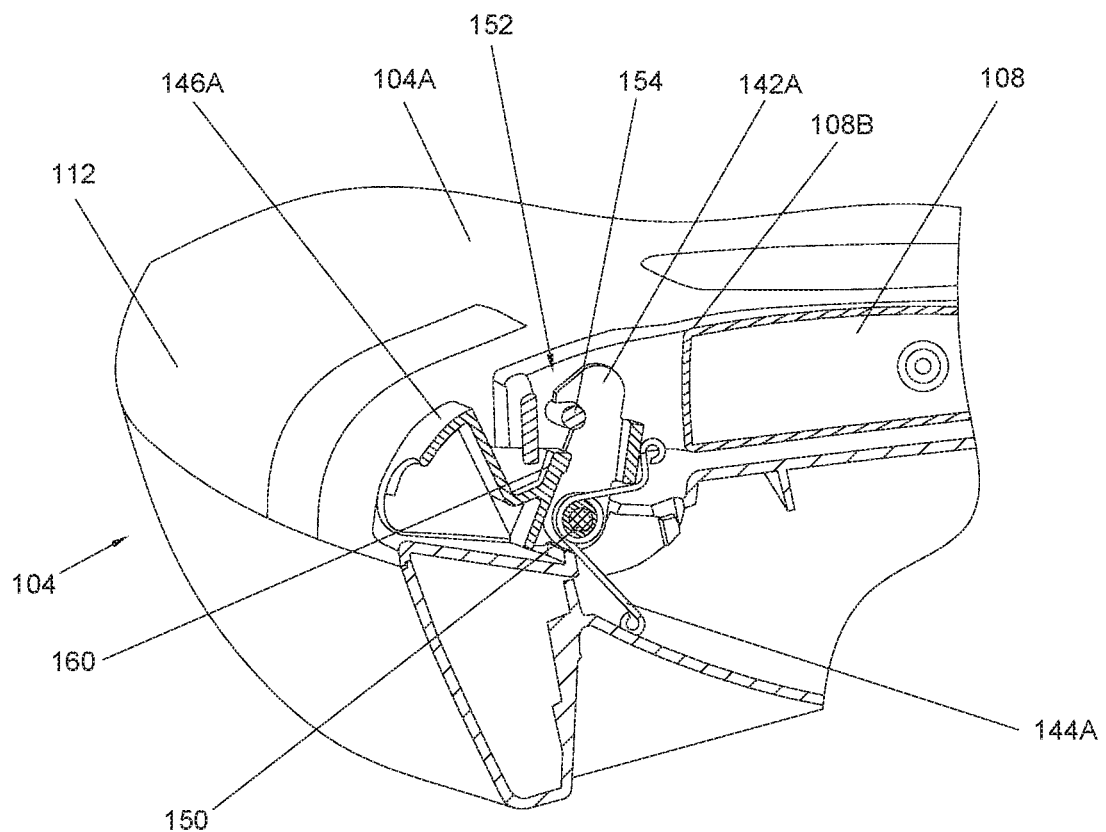
FIG. 9 is a cross-sectional view illustrating a portion of the latching mechanism provided on a seat portion of the child safety seat for locking the belt tightener in position relative to the seat portion.
Figure 10:
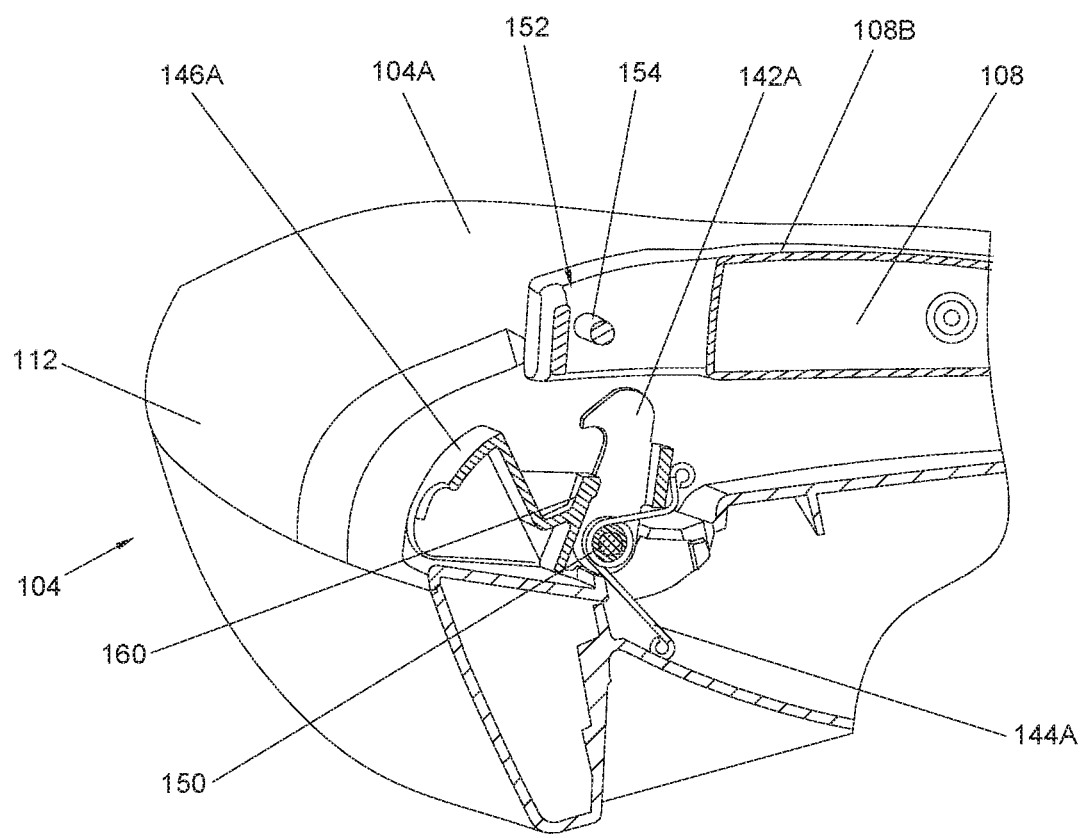
FIG. 10 is a cross sectional view illustrating the belt tightener disengaged from the portion of the latching mechanism provided on the seat portion of the child safety seat.

Referring to FIGS. 3, 9 and 10, the latch 142A is coupled to the seat portion 104, and is movable to lock and unlock the belt tightener 108 with respect to the seat portion 104. More specifically, the latch 142A can engage with the end portion 108B of the belt tightener 108 for locking the belt tightener 108 to the seat portion 104 in the first position, and can disengage from the end portion 108B of the belt tightener 108 for unlocking the belt tightener 108 from the seat portion 104 so that the belt tightener 108 can rotate between the first and second position.

According to an example of construction, the latch 142A may be pivotally connected with the seat portion 104. For example, the latch 142A can have a hole 148, and a pivot shaft 150 (better shown in FIGS. 3, 9 and 10) fixedly connected with the seat platform 112 of the seat portion 104 inside the cavity 126 can pass through the hole 148 for pivotally supporting the latch 142A. The latch 142A can thereby rotate relative to the seat portion 104 between a locking state for engaging with the end portion 108B of the belt tightener 108 and an unlocking state for disengaging from the end portion 108B of the belt tightener 108. FIG. 9 illustrates the belt tightener 108 engaged with the latch 142A, and FIG. 10 illustrates the belt tightener 108 disengaged from the latch 142A.

According to an example of construction, the end portion 108B of the belt tightener 108 can have an opening 152, and a latch engaging portion 154 disposed adjacent to the opening 152. For example, the latch engaging portion 154 may include a pin that is fixedly connected with the belt tightener 108 across the opening 152. The latch 142A can have a hook portion that can travel into the opening 152 and engage with the latch engaging portion 154 for locking the belt tightener 108 to the seat portion 104 in the first position.

Referring to FIGS. 3, 9 and 10, the spring 144A can bias the latch 142A toward the locking state for engagement with the latch engaging portion 154 of the belt tightener 108. According to an example of construction, the spring 144A may be a torsion spring disposed around the pivot shaft 150 that has two ends respectively connected with the latch 142A and the seat portion 104.

The release actuator 146A is coupled to the seat portion 104 and operatively connected with the latch 142A so that the release actuator 146A is operable to cause the latch 142A to move from the locking state to the unlocking state. According to an example of construction, the release actuator 146A can be pivotally connected with the seat portion 104. For example, the release actuator 146A can have a hole 156, and the pivot shaft 150 can pass through the hole 156 for pivotally supporting the release actuator 146A. The release actuator 146A is thereby rotatable relative to the seat portion 104 for urging the latch 142A to move from the locking state to the unlocking state.

According to an example of construction, the release actuator 146A can have an operating portion 158 and a rib 160. The release actuator 146A including the operating portion 158 and the rib 160 may be formed integrally as a single part. The operating portion 158 can have two opposite sidewalls 162, a transversal portion 164 connected with the two sidewalls 162, and an opening 166 delimited at least partially by the two sidewalls 162 and the transversal portion 164. The release actuator 146A may be assembled with the seat portion 104 with the operating portion 158 at least partially received in a front end of the cavity 126 and the rib 160 positioned adjacent to the latch 142A. Once assembled, the operating portion 158 of the release actuator 146A and the latch 142A can generally extend along different radial directions relative to the pivot shaft 150, the operating portion 158 being exposed for operation at a front of the seat portion 104. With this construction, a caregiver can operate the release actuator 146A with a finger partially inserted into the opening 164 of the operating portion 158. As the release actuator 146A rotates, the rib 160 can contact and urge the latch 142A to move from the locking state to the unlocking state.

Referring to FIGS. 2 and 4-8, the latch 142B is coupled to the backrest portion 106, and is operable independently of the latch 142A provided on the seat portion 104. The latch 142B is movable to lock and unlock the belt tightener 108 with respect to the backrest portion 106. More specifically, the latch 142B can engage with the end portion 108B of the belt tightener 108 for locking the belt tightener 108 to the backrest portion 106 in the second position, and can disengage from the end portion 108B of the belt tightener 108 for unlocking the belt tightener 108 from the backrest portion 106 so that the belt tightener 108 can rotate between the first and second position.

Figure 7:
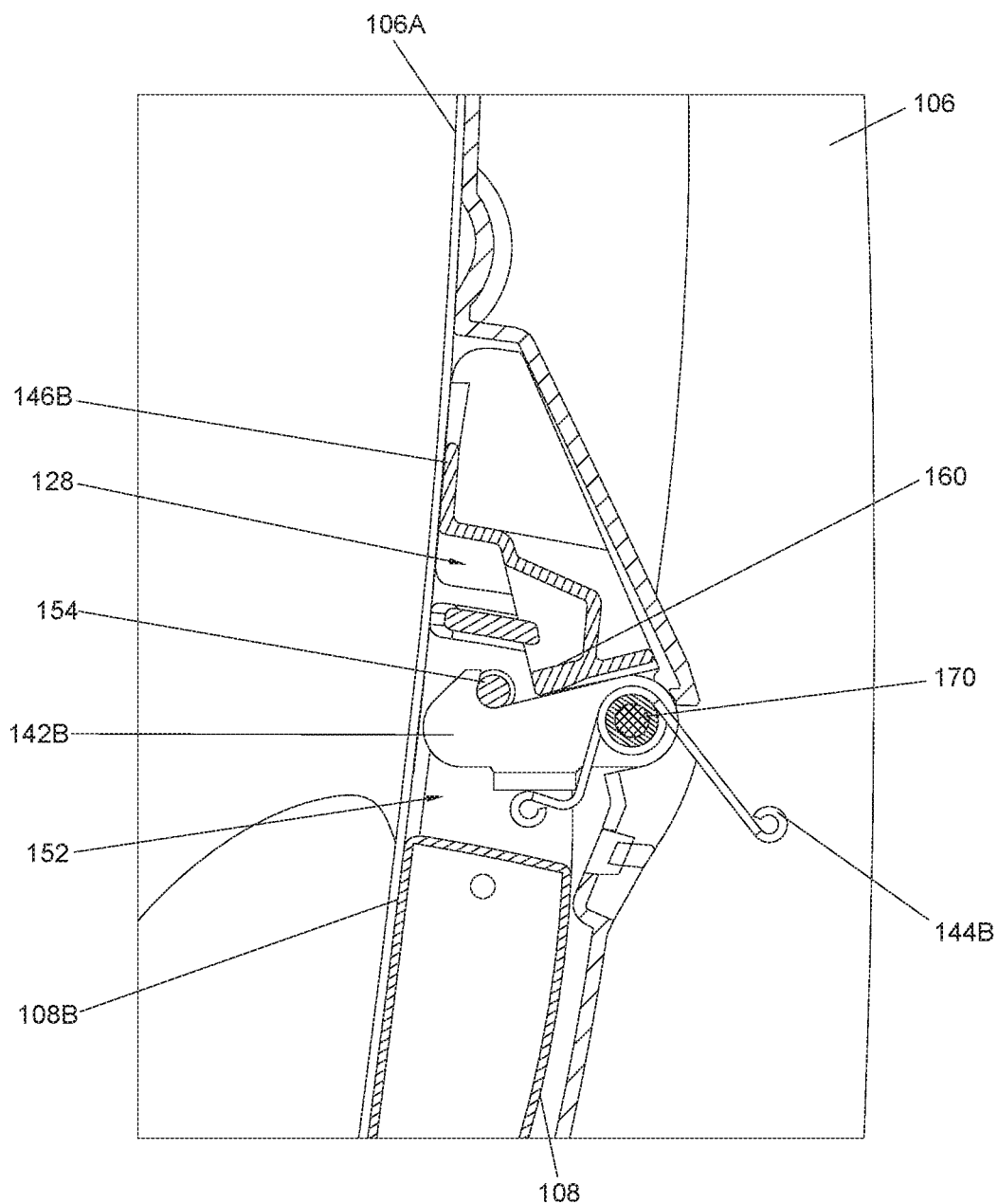
FIG. 7 is a cross-sectional view illustrating a portion of the latching mechanism provided on a backrest portion of the child safety seat for locking the belt tightener to the backrest portion.
Figure 8:
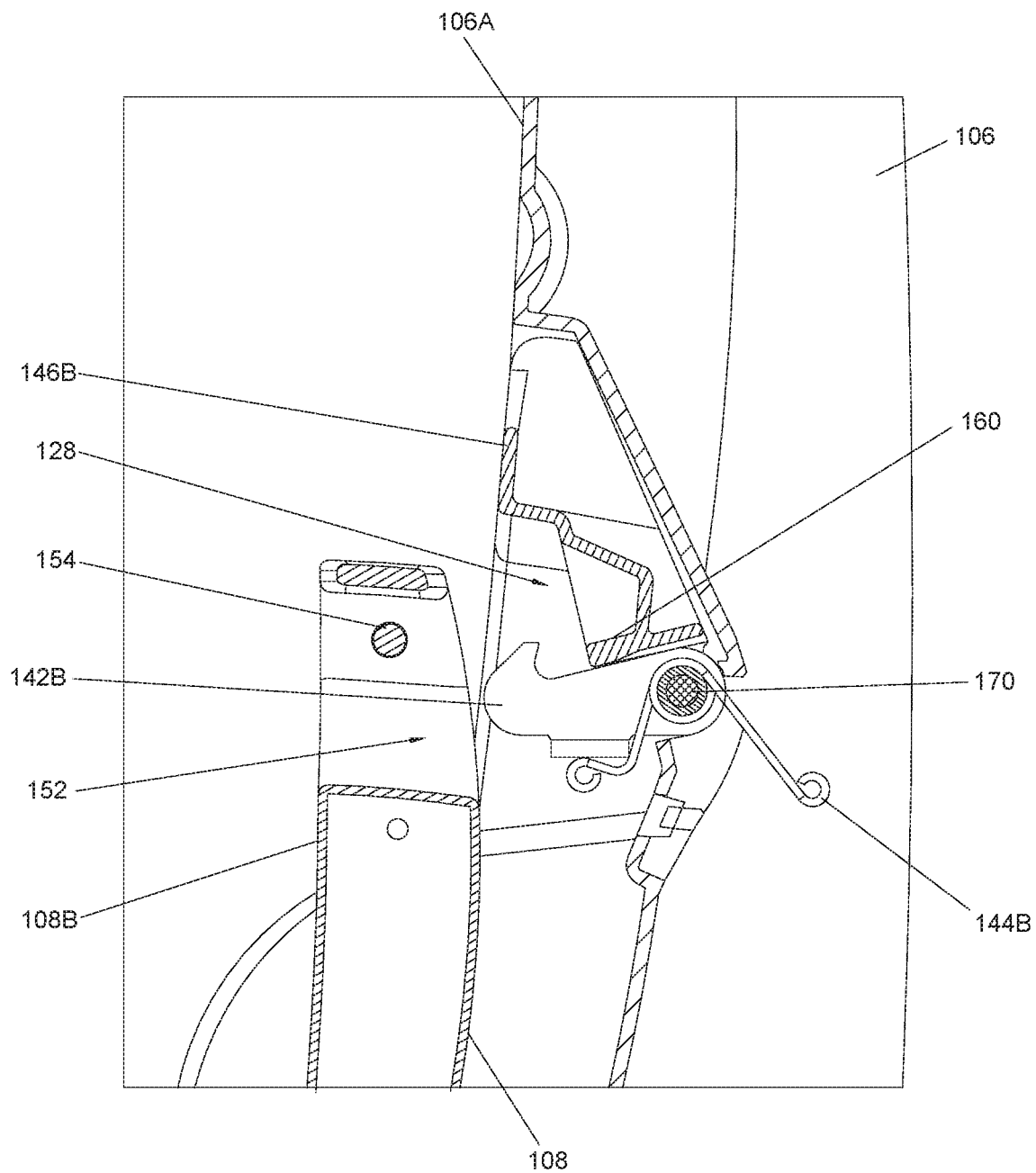
FIG. 8 is a cross sectional view illustrating the belt tightener disengaged from the portion of the latching mechanism provided on the backrest portion of the child safety seat.

According to an example of construction, the latch 142B may be pivotally connected with the backrest portion 106. For example, the latch 142B can have a structure similar to that of the latch 142A shown in FIG. 5 including the hole 148, and a pivot shaft 170 fixedly connected with the backrest portion 106 inside the cavity 128 can pass through the hole 148 for pivotally supporting the latch 142B. The latch 142B can thereby rotate relative to the backrest portion 106 between a locking state for engaging with the end portion 108 of the belt tightener 108 and an unlocking state for disengaging from the end portion 108 of the belt tightener 108. FIG. 7 illustrates the belt tightener 108 engaged with the latch 142B, and FIG. 8 illustrates the belt tightener 108 disengaged from the latch 142B. Like the latch 142A provided on the seat portion 104, the latch 142B can have a hook portion that can travel into the opening 152 and engage with the latch engaging portion 154 provided at the end portion 108B of the belt tightener 108 for locking the belt tightener 108 to the backrest portion 106 in the second position.

Referring to FIGS. 2 and 4-8, the spring 144B can bias the latch 142B toward the locking state for engagement with the latch engaging portion 154 of the belt tightener 108. According to an example of construction, the spring 144B may be a torsion spring disposed around the pivot shaft 170 that has two ends respectively connected with the latch 142B and the backrest portion 106.

The release actuator 146B is coupled to the backrest portion 106 and operatively connected with the latch 142B so that the release actuator 146B is operable to cause the latch 142B to move from the locking state to the unlocking state. According to an example of construction, the release actuator 146B can be pivotally connected with the backrest portion 106. For example, the release actuator 146B can have a structure similar to that of the release actuator 146A shown in FIG. 6 including the hole 156, and the pivot shaft 170 can pass through the hole 156 for pivotally supporting the release actuator 146B. The release actuator 146B is thereby rotatable relative to the backrest portion 106 for urging the latch 142B to move from the locking state to the unlocking state.

Figure 6:
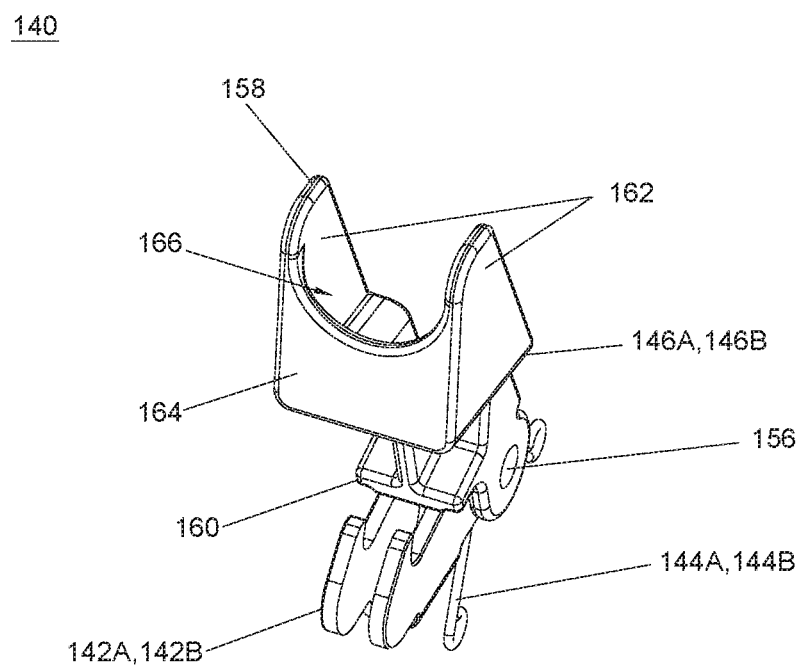
FIG. 6 is a perspective view illustrating construction details of a release actuator operable to cause the latch to move from a locking state to an unlocking state.

According to an example of construction, the release actuator 146B can have a structure similar to that of the release actuator 146A shown in FIG. 6, including the operating portion 158 and the rib 160. The release actuator 146B may be assembled with the backrest portion 106 with the operating portion 158 at least partially received in a top end of the cavity 128 and the rib 160 positioned adjacent to the latch 142B. Once assembled, the operating portion 158 of the release actuator 146B and the latch 142B can generally extend along different radial directions relative to the pivot shaft 170, the operating portion 158 being exposed for operation at a top end of the cavity 128. With this construction, a caregiver can operate the release actuator 146B with a finger partially inserted into the opening 164 of the operating portion 158. As the release actuator 146B rotates, the rib 160 can contact and urge the latch 142B to move from the locking state to the unlocking state.

Exemplary operation of the belt tightener 108 is described hereinafter with reference to FIGS. 1-10. Assume that the child safety seat 100 is to be installed in the rearward facing position. While the belt tightener 108 is in a position opening the cavity 126 of the seat portion 104, the anchoring belt 124 is installed along the belt path 120 so as to extend transversally across the cavity 126. Then the belt tightener 108 is rotated away from the cavity 128 to the first position so that the pressing portion 130A of the belt tightener 108 can push and clamp the anchoring belt 124 in the cavity 126. Once the belt tightener 108 is in the first position, the latch 142A can engage with the end portion 108B of the belt tightener 108 under the biasing force of the spring 144A to lock the belt tightener 108 in the first position. For releasing the anchoring belt 124, a caregiver can operate the release actuator 146A, which can urge the latch 142A to move and disengage from the end portion 108B of the belt tightener 108. The belt tightener 108 can be thereby unlocked and rotated to open the cavity 126 for removal of the anchoring belt 124. When the belt tightener 108 is unlocked, the biasing force of the spring 138 may cause a rotational displacement of the belt tightener 108 that ejects the end portion 108B of the belt tightener 108 out of the cavity 126, which may facilitate manual rotation of the belt tightener 108 for opening the cavity 126.

Assume that the child safety seat 100 is to be installed in the forward facing position. While the belt tightener 108 is in a position opening the cavity 128 of the backrest portion 106, the anchoring belt 124 is installed along the belt path 122 so as to extend transversally across the cavity 128. Then the belt tightener 108 is rotated away from the cavity 126 to the second position so that the pressing portion 130B of the belt tightener 108 can push and clamp the anchoring belt 124 in the cavity 128. Once the belt tightener 108 is in the second position, the latch 142B can engage with the end portion 108B of the belt tightener 108 under the biasing force of the spring 144B to lock the belt tightener 108 to the backrest portion 106. For releasing the anchoring belt 124, a caregiver can operate the release actuator 146B, which can urge the latch 142B to move and disengage from the end portion 108B of the belt tightener 108. The belt tightener 108 can be thereby unlocked and rotated to open the cavity 128 for removal of the anchoring belt 124.

Advantages of the child safety seat described herein include the ability to provide a belt tightener that is easy to operate and can tension an anchoring belt for securely attaching a child safety seat on a vehicle seat in a forward or rearward facing configuration.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:
1. A child safety seat comprising:
a seat shell adapted to receive a child, the seat shell including a seat portion having a first belt path, and a backrest portion having a second belt path, each of the first and second belt path being configured to receive an anchoring belt for attaching the child safety seat on a vehicle seat;
a belt tightener pivotally connected with the seat shell and carrying a first and a second pressing portion, the belt tightener being movable as a single body between a first position for clamping the anchoring belt disposed along the first belt path with the first pressing portion in contact with the anchoring belt, and a second position for clamping the anchoring belt disposed along the second belt path with the second pressing portion in contact with the anchoring belt; and a latching mechanism operable to lock the belt tightener in the first and second position.

2. The child safety seat according to claim 1, wherein the backrest portion is attachable to and detachable from the seat portion.

3. The child safety seat according to claim 2, wherein the seat portion includes a support base and a seat platform connected with each other, the seat platform being movable relative to the support base for recline adjustment.

4. The child safety seat according to claim 2, wherein the belt tightener is pivotally connected with the seat portion.

5. The child safety seat according to claim 1, wherein the latching mechanism includes a first latch coupled to the seat portion, and a second latch coupled to the backrest portion, the first latch being movable to lock and unlock the belt tightener with respect to the seat portion, the second latch being movable to lock and unlock the belt tightener with respect to the backrest portion.

6. The child safety seat according to claim 5, wherein the first latch is pivotally connected with the seat portion, and is rotatable between a locking state for engaging with an end portion of the belt tightener and an unlocking state for disengaging from the end portion of the belt tightener.

7. The child safety seat according to claim 5, wherein the second latch is pivotally connected with the backrest portion, and is rotatable between a locking state for engaging with an end portion of the belt tightener and an unlocking state for disengaging from the end portion of the belt tightener.

8. The child safety seat according to claim 5, wherein the belt tightener has an end portion provided with a latch engaging portion, the first latch being engaged with the latch engaging portion for locking the belt tightener to the seat portion in the first position, and the second latch being engaged with the latch engaging portion for locking the belt tightener to the backrest portion in the second position.

9. The child safety seat according to claim 5, wherein the latching mechanism further includes a first spring connected with the first latch and a second spring connected with the second latch, the first spring biasing the first latch for engagement with the belt tightener, and the second spring biasing the second latch for engagement with the belt tightener.

10. The child safety seat according to claim 5, wherein the latching mechanism further includes a first release actuator coupled to the seat portion and a second release actuator coupled to the backrest portion, the first release actuator being operable to cause the first latch to move for unlocking the belt tightener, the second release actuator being operable to cause the second latch to move for unlocking the belt tightener.

11. The child safety seat according to claim 10, wherein the first release actuator has an operating portion exposed for operation at a front of the seat portion.

12. A child safety seat comprising:
a seat shell adapted to receive a child, the seat shell including a seat portion having a first belt path, and a backrest portion having a second belt path, each of the first and second belt path being configured to receive an anchoring belt for attaching the child safety seat on a vehicle seat, the backrest portion being attachable to and detachable from the seat portion;
a belt tightener pivotally connected with the seat shell, the belt tightener being movable as a single body between a first position for clamping the anchoring belt disposed along the first belt path, and a second position for clamping the anchoring belt disposed along the second belt path; and
a latching mechanism operable to lock the belt tightener in the first and second position.

13. The child safety seat according to claim 12, wherein the seat portion includes a support base and a seat platform connected with each other, the seat platform being movable relative to the support base for recline adjustment.

14. The child safety seat according to claim 12, wherein the belt tightener is pivotally connected with the seat portion.

15. The child safety seat according to claim 12, wherein the belt tightener carries a first and a second pressing portion, the belt tightener being adapted to clamp an anchoring belt with the first pressing portion in contact with the anchoring belt in the first position and with the second pressing portion in contact with the anchoring belt in the second position.

16. The child safety seat according to claim 12, wherein the latching mechanism includes a first latch coupled to the seat portion, and a second latch coupled to the backrest portion, the first latch being movable to lock and unlock the belt tightener with respect to the seat portion, the second latch being movable to lock and unlock the belt tightener with respect to the backrest portion.

17. The child safety seat according to claim 16, wherein the first latch is pivotally connected with the seat portion, and is rotatable between a locking state for engaging with an end portion of the belt tightener and an unlocking state for disengaging from the end portion of the belt tightener.

18. The child safety seat according to claim 16, wherein the second latch is pivotally connected with the backrest portion, and is rotatable between a locking state for engaging with an end portion of the belt tightener and an unlocking state for disengaging from the end portion of the belt tightener.

19. The child safety seat according to claim 16, wherein the belt tightener has an end portion provided with a latch engaging portion, the first latch being engaged with the latch engaging portion for locking the belt tightener to the seat portion in the first position, and the second latch being engaged with the latch engaging portion for locking the belt tightener to the backrest portion in the second position.

20. The child safety seat according to claim 16, wherein the latching mechanism further includes a first spring connected with the first latch and a second spring connected with the second latch, the first spring biasing the first latch for engagement with the belt tightener, and the second spring biasing the second latch for engagement with the belt tightener.

21. The child safety seat according to claim 16, wherein the latching mechanism further includes a first release actuator coupled to the seat portion and a second release actuator coupled to the backrest portion, the first release actuator being operable to cause the first latch to move for unlocking the belt tightener, the second release actuator being operable to cause the second latch to move for unlocking the belt tightener.

22. The child safety seat according to claim 21, wherein the first release actuator has an operating portion exposed for operation at a front of the seat portion.

* * * * *